United States Patent
Koziel et al.

(10) Patent No.: US 12,217,018 B2
(45) Date of Patent: Feb. 4, 2025

(54) METHOD AND ARCHITECTURE FOR PERFORMING MODULAR ADDITION AND MULTIPLICATION SEQUENCES

(71) Applicant: PQSecure Technologies, LLC, Boca Raton, FL (US)

(72) Inventors: Brian C. Koziel, Plano, TX (US); Rami El Khatib, Boca Raton, FL (US)

(73) Assignee: PQSecure Technologies, LLC, Boca Raton, FL (US)

(*) Notice: Subject to any disclaimer, the term of this patent is extended or adjusted under 35 U.S.C. 154(b) by 0 days.

(21) Appl. No.: 17/925,367

(22) PCT Filed: Sep. 20, 2021

(86) PCT No.: PCT/US2021/051136
§ 371 (c)(1),
(2) Date: Mar. 23, 2023

(87) PCT Pub. No.: WO2023/043467
PCT Pub. Date: Mar. 23, 2023

(65) Prior Publication Data
US 2024/0220201 A1   Jul. 4, 2024

(51) Int. Cl.
*G06F 7/523*  (2006.01)
*G06F 7/50*   (2006.01)

(52) U.S. Cl.
CPC .............. *G06F 7/523* (2013.01); *G06F 7/50* (2013.01)

(58) Field of Classification Search
CPC .................................. G06F 7/523; G06F 7/50
See application file for complete search history.

(56) References Cited

U.S. PATENT DOCUMENTS

| | | | |
|---|---|---|---|
| 6,778,666 B1* | 8/2004 | Kuzmich | H04L 9/3066 708/492 |
| 8,250,367 B2* | 8/2012 | Broker | H04L 9/3073 713/176 |
| 2004/0167952 A1 | 8/2004 | Gueron | |
| 2010/0172491 A1 | 7/2010 | Broker | |
| 2014/0369492 A1* | 12/2014 | Lambert | H04L 9/3066 380/28 |
| 2015/0339103 A1 | 11/2015 | Olsen | |

* cited by examiner

*Primary Examiner* — Michael D. Yaary
(74) *Attorney, Agent, or Firm* — Johnson Dalal; Mark C. Johnson

(57) ABSTRACT

A computer processing system that includes at least one arithmetic logic unit in a computer processing device and includes at least one addition circuit operably configured to compute addition operations, operably configured to receive two numerical inputs, and operably configured to compute a sum and includes at least one modular multiplication circuit operably configured to receive the sum from the at least one addition circuit, receive at least one other numerical input, and receive a numerical modulus to perform a modular multiplication operation and generate a modular multiplication operation result.

20 Claims, 13 Drawing Sheets

METHOD AND ARCHITECTURE FOR PERFORMING MODULAR ADDITION AND MULTIPLICATION SEQUENCES

FIELD OF THE INVENTION

The present invention relates generally to hardware, systems, implementation, and methods directed towards the computation of a modular addition and modular multiplication, and, more particularly, relates to performing a sequence involving one or more modular additions and a single modular multiplication with fewer computational resources.

BACKGROUND OF THE INVENTION

Modular arithmetic is a system of arithmetic for integers, where numbers that reach a certain value called the modulus are set back to the identity value (usually 0). Modular arithmetic is one of the foundations of number theory, studied extensively by mathematicians and is used heavily in cryptography and other applications.

For cryptography and other applications, many modular operations can be constructed as a sequence of modular addition/subtraction (a±b mod m) and modular multiplication (a×b mod m). Some examples include, but are not limited to, modular exponentiation ($a^b$ mod m) or modular square root operations ($\sqrt{a}$ mod m). In the cryptographic application scenarios, a cryptosystem's performance can be highly dependent on the low-level modular arithmetic.

When implementing these designs, modular addition/subtraction is generally fairly simple to implement, but modular multiplication is cumbersome and is typically subject to a wide variety of optimization techniques. For efficiency, cryptography practitioners may choose to implement modular multiplication by performing a multiplication followed by a Montgomery reduction or a Barrett reduction.

One specific requirement of cryptographic implementations is to perform a sequence of one or more modular additions with a single modular multiplication. If this operation is repeatedly needed, then a small and efficient method to perform this computation is needed.

SUMMARY OF THE INVENTION

Here, we define an "efficient" implementation of modular addition and modular multiplication in a computer system as one that performs a sequence of such operations with fewer gates or less area than the state-of-the-art.

The invention provides a hardware, system, implementation, and method for efficiently implementing a sequence of one or more modular addition operations followed by a modular multiplication operation.

With the foregoing and other objects in view, a computer processing system is disclosed that includes at least one arithmetic logic unit in a computer processing device and has at least one addition circuit operably configured to compute addition operations, operably configured to receive two numerical inputs, and operably configured to compute a sum. Further, the arithmetic logic unit may include at least one modular multiplication circuit operably configured to receive the sum from the at least one addition circuit, receive at least one other numerical input, and receive a numerical modulus to perform a modular multiplication operation and generate a modular multiplication operation result.

In accordance with another feature, an embodiment of the present invention also includes at least one sequencing unit operably configured to direct the sum from the at least one addition circuit to the at least one modular multiplication circuit to perform a sequence of at least one of the addition operations and terminating the sequence with the modular multiplication operation.

In accordance with a further feature of the present invention, the at least one sequencing unit is operably configured to store the sum in a memory and operably configured to direct the sum stored on the memory to the at least one modular multiplier circuit.

In accordance with an additional feature of the present invention, the at least one modular multiplication circuit operably configured to directly receive the sum from the at least one addition circuit.

In accordance with yet another feature of the present invention, the at least one addition circuit is operably configured to take three or more numerical inputs to compute the sum.

In accordance with another feature, an embodiment of the present invention also includes the arithmetic logic unit having the at least one addition circuit that is operably configured to compute a difference between the three or more numerical inputs by performing an addition with at least one negated input, wherein the at least one negated input is computed from at least one of the three or more numerical inputs.

In accordance with another feature of the present invention, the at least one addition circuit is operably configured to compute a difference between the two numerical inputs by performing an addition with at least one negated input, wherein the at least one negated input is computed from at least one of the two numerical inputs.

In accordance with another feature, an embodiment of the present invention also includes the at least one addition circuit having an inverter circuit operably configured to negate the one of the two numerical inputs to the at least one addition circuit.

In accordance with a further feature of the present invention, the at least one modular multiplication circuit is operably configured to perform any combination of Montgomery multiplication, Barrett multiplication, residue number system multiplication, or Mersenne-prime multiplication to generate the modular multiplication result of the modular multiplication operation.

In accordance with an exemplary feature of the present invention, the arithmetic logic unit is operably configured to perform extension field multiplication utilizing the sum and the modular multiplication operation result. In further embodiments, the at least one addition circuit and at least one modular multiplication circuit are used as part of an elliptic curve or isogeny-based cryptosystem.

Also in accordance with the present invention, a method for performing addition and modular multiplication sequences is disclosed that includes providing a computer processing device having at least one arithmetic logic unit with at least one addition circuit and at least one modular multiplication circuit, receiving, within the at least one addition circuit, at least two numerical inputs and computing a sum utilizing addition operations of the at least one addition circuit, and receiving the sum, at least one other numerical input, and a numerical modulus within the at least one modular multiplication circuit and performing a modular multiplication operation to generate a modular multiplication operation result.

In accordance with another feature, an embodiment of the present invention also includes providing at least one sequencing unit within the at least one arithmetic logic unit of the computer processing device, directing the sum from the at least one addition circuit to the at least one modular multiplication circuit, and performing a sequence of at least one of the addition operations and terminating the sequence with the modular multiplication operation.

In accordance with yet another feature, an embodiment of the present invention also includes storing the sum in a memory by the at least one sequencing unit and directing the sum stored on the memory to the at least one modular multiplier circuit.

In accordance with yet another feature, an embodiment of the present invention also includes directly receiving the sum in the at least one modular multiplication circuit from the at least one addition circuit.

In accordance with a further feature, an embodiment of the present invention also includes computing, with the at least one addition circuit, a difference between the at least two numerical inputs by performing an addition with at least one negated input and computing the at least one negated input from at least one of the at least two numerical inputs.

In accordance with an additional feature, an embodiment of the present invention also includes providing an inverter circuit within the at least one addition circuit and negating the one of the at least two numerical inputs to the at least one addition circuit.

In accordance with another feature, an embodiment of the present invention also includes performing any combination of Montgomery multiplication, Barrett multiplication, residue number system multiplication, or Mersenne-prime multiplication with the at least one modular multiplication circuit to generate the modular multiplication result of the modular multiplication operation.

In accordance with another feature, an embodiment of the present invention also includes performing extension field multiplication by the arithmetic logic unit utilizing the sum and the modular multiplication operation result.

In accordance with yet another feature, an embodiment of the present invention also includes utilizing the at least one addition circuit and at least one modular multiplication circuit as part of an elliptic curve or isogeny-based cryptosystem.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention.

While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of any processing chip. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
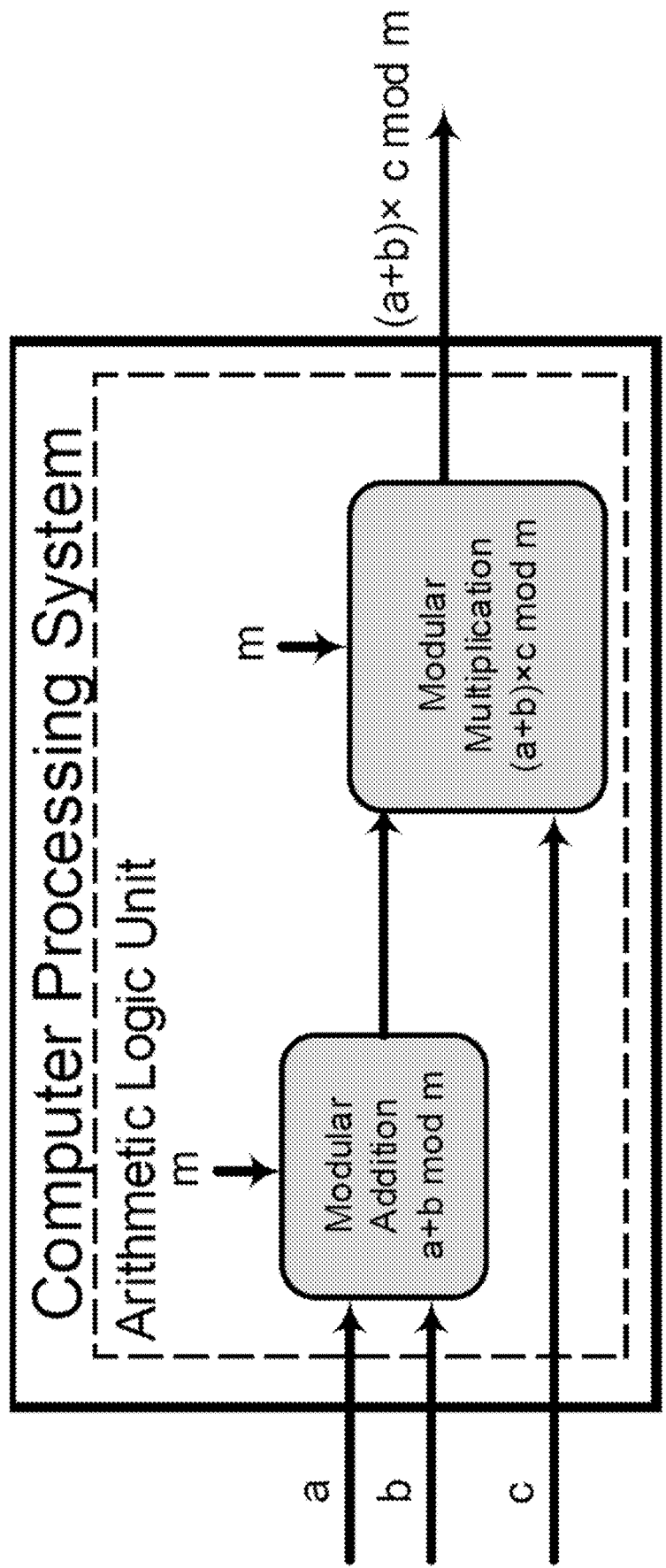
FIG. 1 is a schematic diagram depicting the prior art for computing a modular addition and modular multiplication operation by cascading a modular addition circuit with a modular multiplication circuit.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient hardware, systems, implementation, and methods for efficiently implementing sequences of modular addition and modular multiplication operations in a computer processing device.

Modular arithmetic operates on the premise of cycles. When a value goes outside of a range, it circles back to a new number in its range. This has many such applications for communication and cryptography as the result can only be within a range.

This invention focuses on a specific sequence of modular arithmetic that can be made faster and smaller by using certain assumptions. Namely, a modular addition and modular multiplication can effectively be interleaved inside a computer processing system, e.g., the computer processing system 300 exemplified schematically in FIG. 3 and the other figures. This invention applies well to implementations of cryptosystems based on modular arithmetic. For instance, elliptic curve cryptography heavily uses modular addition and modular multiplication to achieve key establishment or authentication. Another use that applies to both communication and cryptography is the efficient performance of extension field arithmetic, which may be constructed as a sequence of modular addition and modular multiplication operations.

Figure 3:
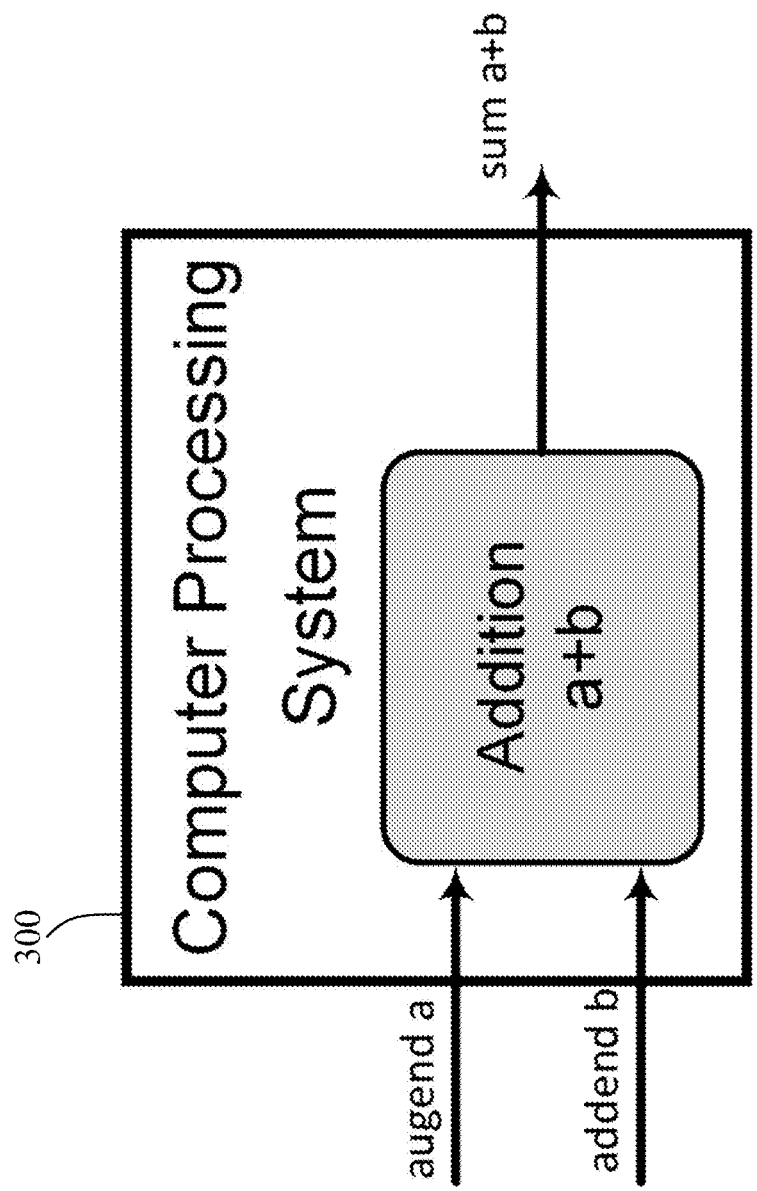
FIG. 3 is a schematic diagram depicting an addition circuit within a computer processing unit. Given two inputs a and b, a sum a+b is computed.

A simple addition circuit in a computer processing device 300 is shown in FIG. 3. With the arbitrary length inputs a and b and arbitrary length output sum, the circuit computes sum=a+b. Here, we call term "a" the augend, term "b" the addend, and the "sum" as the resulting sum.

Modular addition computes a+b mod m, where "a" is the augend, "b" is the addend, and "m" is the modulus. Since m is the modulus, the expected result is between 0 and m−1. If a+b is larger than m or less than zero, then the modulus operation pushes the value back to this range by subtracting or adding a multiple of m, respectively. Modular subtraction is a similar process, whereby a−b is performed, and a conditional addition is performed if the first result is negative.

When modular addition is implemented on a computing device, such as a hardware circuit or software program, some assumptions can be used to accelerate the operation. For instance, if a and b are both already modulo m, then the final result is guaranteed to be within the range [0,2×m−2]. This limits the size of any adder chains for the computation and allows a simple reduction. Namely, if the result of a+b is in the range [0,m−1], then nothing needs to be done. However, if the result of a+b is in the range [m,2×m−2], then the reduction can be performed by computing a+b−m. Thus, modular addition can be implemented as an addition followed by a conditional subtraction.

Figure 4:
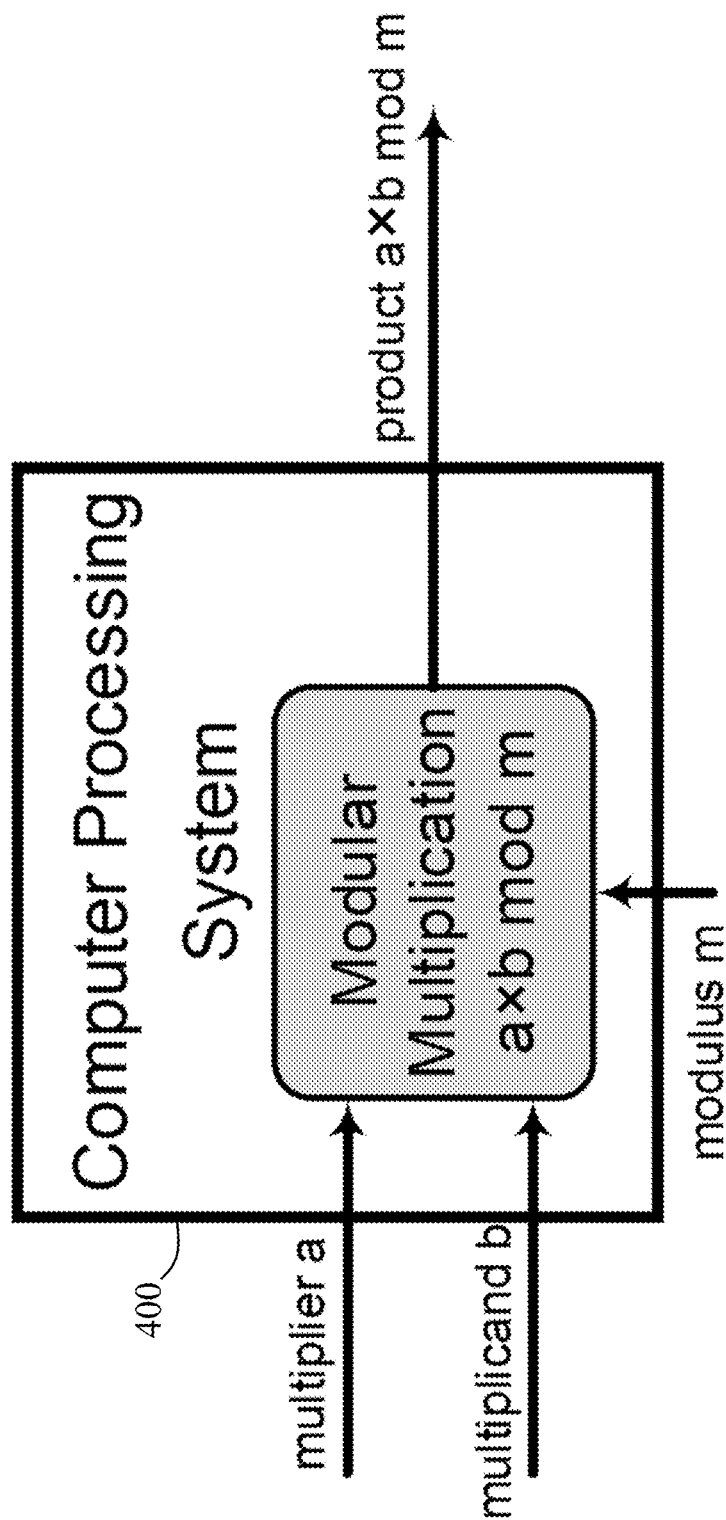
FIG. 4 is a schematic diagram depicting a modular multiplication circuit within a computer processing unit. Given two operands to multiply a, b, and a modulus m, the modular multiplication results a×b mod m is computed.

Implementations of modular multiplication, however, are more complex. Modular multiplication computes the product a×b and reduces the result modulo m. A high-level view of a modular multiplication is shown in FIG. 4 as part of a computer processing system 400. Here, the first operand "a" is the multiplier, operand "b" is the multiplicand, and "m" is the modulus. Similar to the modular addition circuit implementation, we can assume that the inputs are already reduced modulo m. Since the input operands are in the range [0,m−1], the product of a×b is in the range [0, m×m−2×m+1]. In terms of bitlength, the product is expected to have at most twice as many bits as the modulus, so a modular multiplication reduction is a cumbersome process.

Some examples of efficient modular reduction for multiplication include, but are not limited to, Montgomery reduction, Barrett reduction, residue number system, and special-shape reductions such as for Mersenne primes. As practitioners will appreciate, each of these reduction methods have their own caveats and assumptions. For instance, the result of Montgomery reduction is in the range [0, 2×m−1], so this result may be further reduced with a conditional subtraction.

Figure 2:
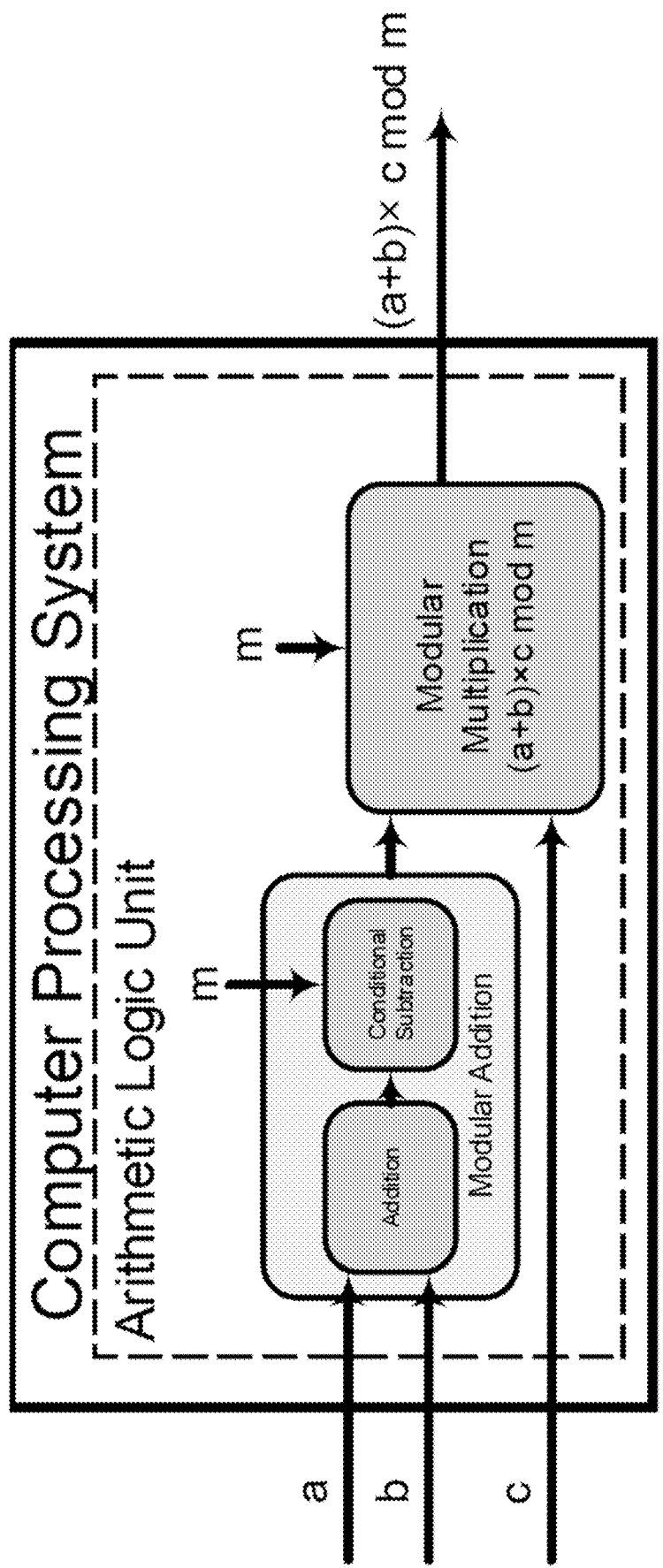
FIG. 2 is an additional schematic diagram depicting the prior art for computing a modular addition and modular multiplication operation, where the modular addition is computed via an addition circuit and a conditional subtraction circuit inside the modular addition circuit.

This invention provides a new solution for efficient computations involving sequences of modular addition and modular multiplication operations. With reference to FIG. 1, the prior art processing systems and arithmetic logic unit (RLU computes a (a+b)×c mod m by computing the modular addition operation a+b mod m. The output of the modular addition circuit is then fed to the modular multiplication circuit, where the final result, (a+b)×c mod m, is computed. The prior art computer processing system depicted in FIG. 2 shows an interpretation of the modular addition where it is composed by an addition circuit to compute a+b and a conditional subtraction circuit to compute a+b−m. This assumes that both a and b are already reduced modulo m. If a+b is larger than m, then the conditional subtraction result is used. The conditional subtraction circuit can also be implemented as an addition circuit where the second input (the modulus) is negated. In two's complement addition, a value is negated or inverted by flipping all bits in its digital representation and adding 1.

Figure 5:
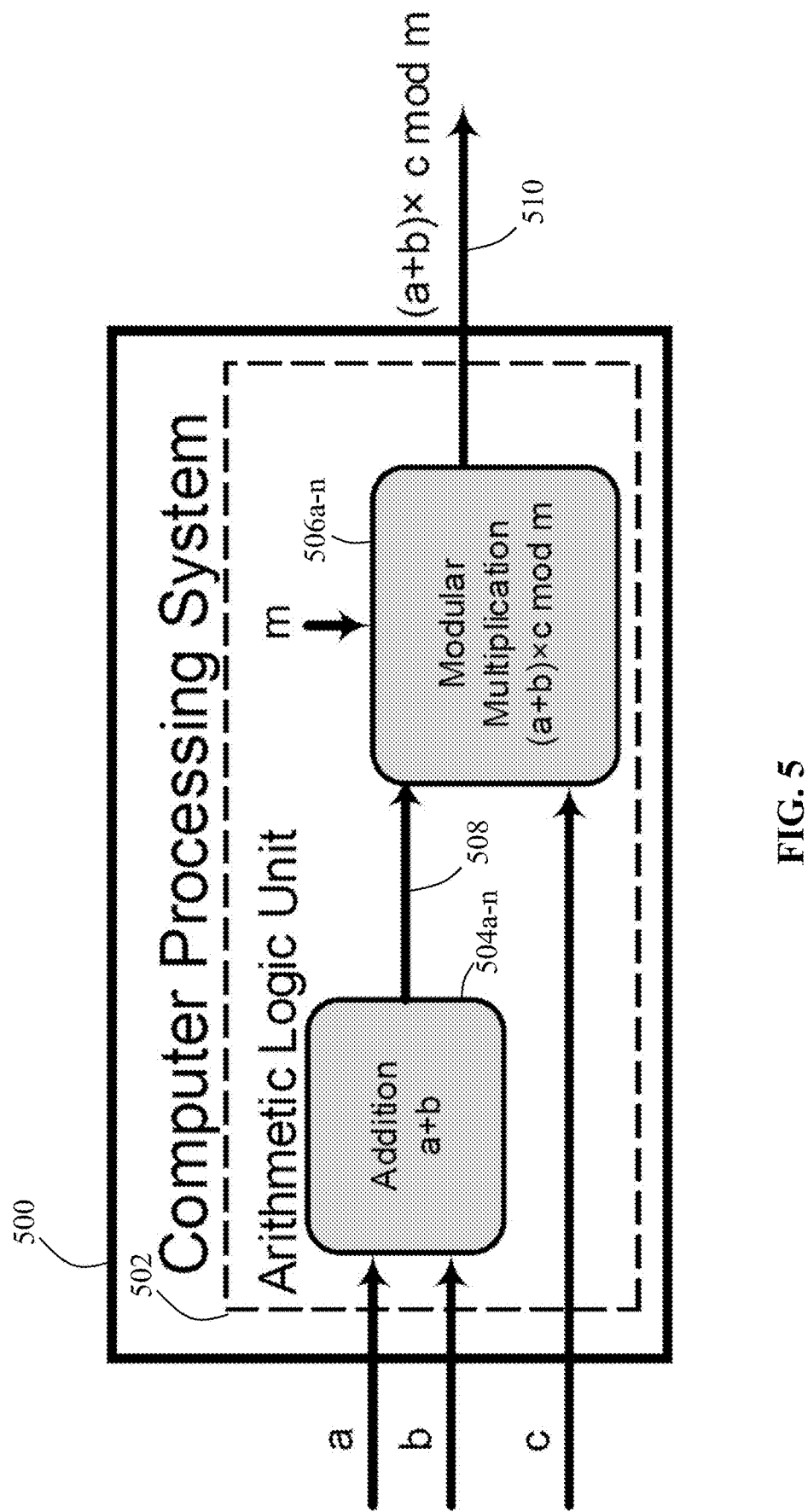
FIG. 5 is a schematic diagram depicting one embodiment of this innovation. When computing the result of modular addition followed by modular multiplication, this can efficiently be computed with an addition and modular multiplication circuit.

The primary embodiment of this invention is to efficiently cascade modular addition and modular multiplications for use in a computer processing system 500, as shown best in FIG. 5. Notably, a modular addition operation or circuit 504 as part of an arithmetic logic unit 502 followed by a modular multiplication operation or circuit 506 can be more efficiently implemented as an addition followed by a modular multiplication circuit 506. From a high-level view, this removes the need for a conditional subtraction operation as the addition result is directly used by the modular multiplication unit. Here, since we forego the conditional subtraction circuit, our modular addition portion of the operation requires half as many computations and area as the prior art. As a side effect, the inputs to the modular multiplication will be outside of the range [0,m−1], resulting in a slightly longer multiplication and reduction. However, if the multiplication and reduction are implemented on a large-radix such as 32-bits at a time then these extra multiplication and reduction bits may have already been used, resulting in no impact to the performance or area of the modular multiplication circuit.

As an example, consider FIG. 5 that computes (a+b)×c mod m. The naive approach would have computed this by performing a+b mod m followed by (a+b)×c mod m. This a+b mod m must compute a+b and then perform the conditional subtraction a+b−m, resulting in a longer critical path. Our approach skips the conditional subtraction entirely and just feeds the addition output to the modular multiplication multiplier. Let us assume that m is the 521-bit Mersenne prime $2^{521}-1$.

Initially, all inputs a, b, and c are in the range [0,m−1]. Thus, the addition result is in the range [0,2×m−2], which is at most 522 bits. Modular multiplication multiplicand c is still at most 521 bits, so this modular multiplication unit performs a 522×521-bit multiplication and reduction. If the modular multiplication unit split this operation into 32-bit multiplications, then the modular multiplier could handle up to 544 bit inputs at a maximum.

Still referring to FIG. 5, said architecture may include one or more arithmetic logic unit(s) 502 in a computer processing device. Preferably, there is a singular arithmetic logic unit 502, but others may also be utilized. The arithmetic logic unit(s) 502 may have one or more addition circuit(s) 504a-n, wherein "n" represents any number greater than one. The addition circuit(s) 504a-n are each operably configured to compute addition operations, operably configured to receive two numerical inputs (e.g., inputs a, b), and operably configured to compute a sum 508. Furthermore, one or more modular multiplication circuit(s) 506a-n may be each operably configured to receive the sum 508 from the at least one addition circuit 504a-n, receive at least one other numerical input, and receive a numerical modulus to perform a modular multiplication operation and generate a modular multiplication operation result 510.

Figure 6:
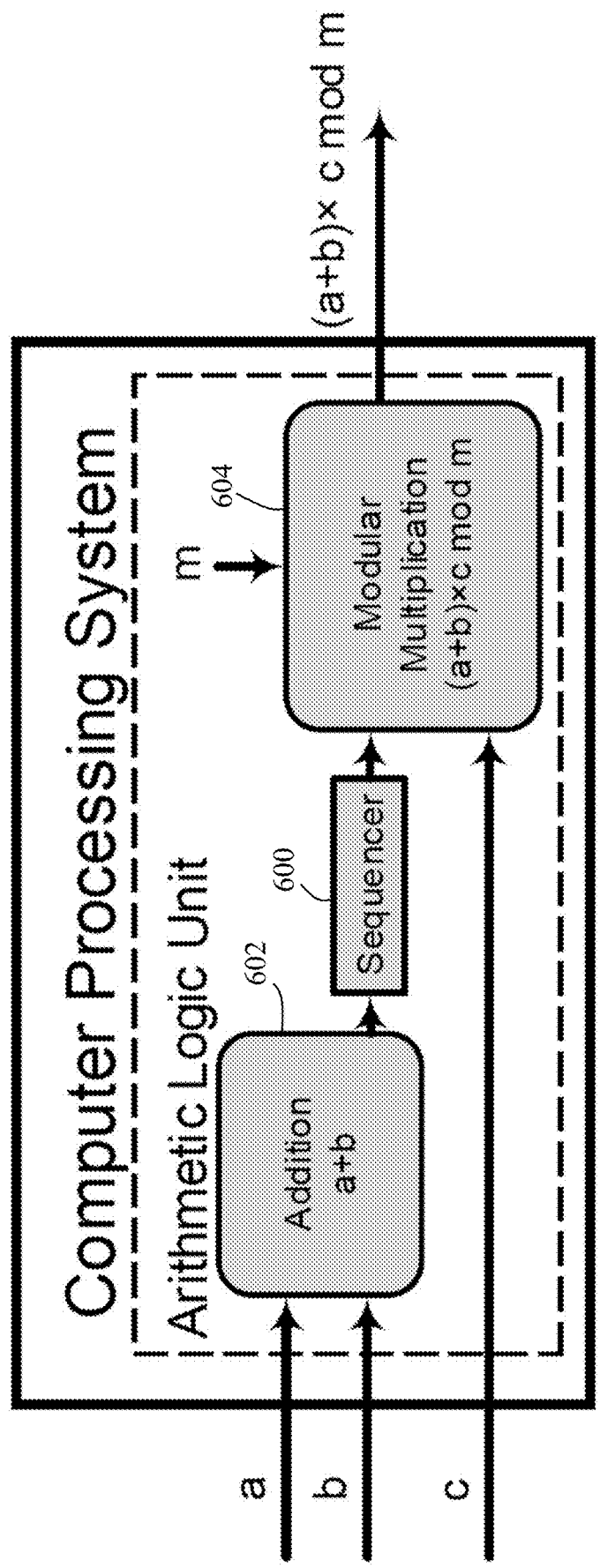
FIG. 6 is a schematic diagram depicting a vision of this invention where a sequencer is used to direct the output of the addition circuit to the modular multiplication circuit.

There are many additional such visions of this invention with regards to how the addition circuit's sum is transported to the input of the modular multiplication circuit. One simple solution, is a direct connection, which may be useful if the output of the addition is always used in the multiplication circuit. Another interpretation, shown in FIG. 6, involves a sequencer 600 which is a digital controller operably configured to transport the addition circuit's sum to the modular multiplication circuit's input. This sequencer 600 can be as simple as a multiplexer circuit to select the addition circuit's sum or other values. The one or more sequencing unit(s) 600 are operably configured to direct the sum from the at least one addition circuit 602 to the at least one modular multiplication circuit 604a-n to perform a sequence of at least one of the addition operations and terminating the sequence with the modular multiplication operation 604

Figure 7:
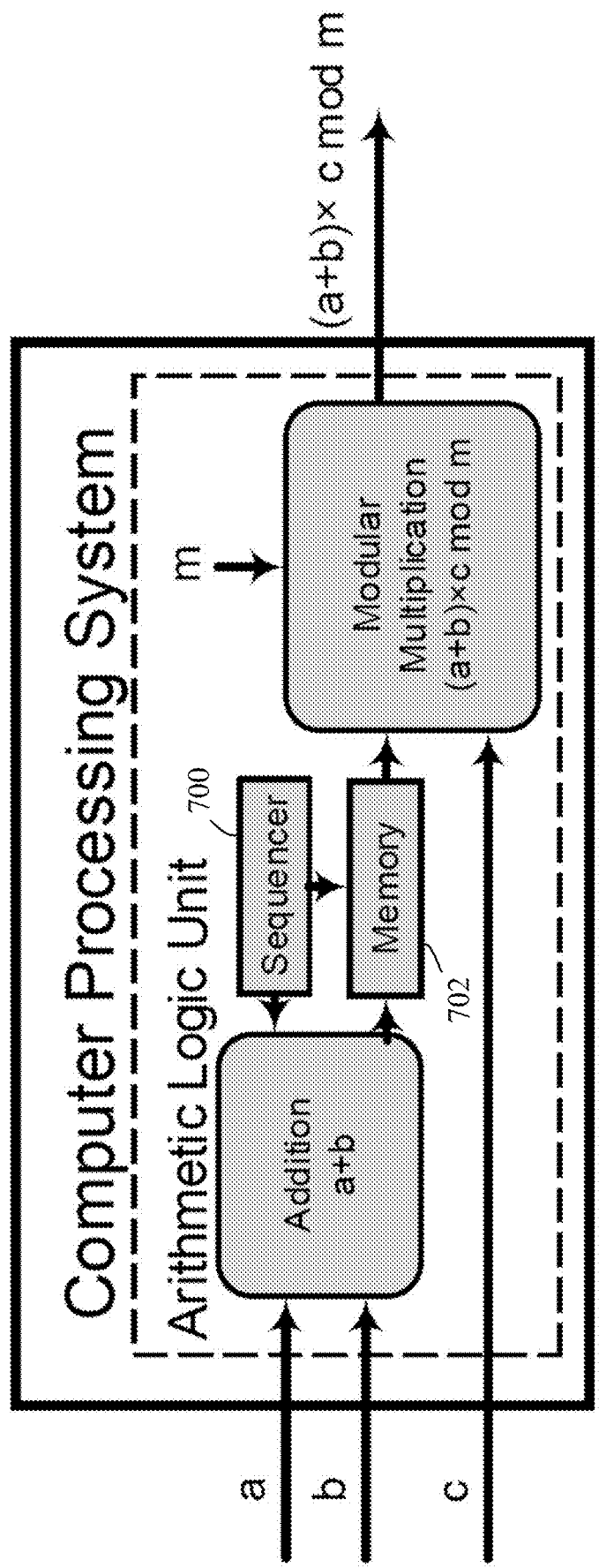
FIG. 7 is a schematic diagram depicting an embodiment of this innovation where a sequencer directs the output of the addition circuit to a memory block which is then directed to the modular multiplication circuit.

Another view of this sequencer 700 is shown in FIG. 7, where the sequencer 700 directs the addition circuit's sum to a memory block 702. Here, the memory block 702 could be, but is not limited to, static or dynamic memory, whether it is read from a read-only memory unit, random access memory unit, flip-flops, or internally stored values. In one embodiment, the at least one sequencing unit 600, 700 is operably configured to store the sum in the memory 702 and operably configured to direct the sum stored on the memory to the at least one modular multiplier circuit. As seen in FIG. 5, the at least one modular multiplication circuit 506a-n is operably configured to directly receive the sum 508 from the one or more addition circuit(s) 504a-n.

Figure 8:
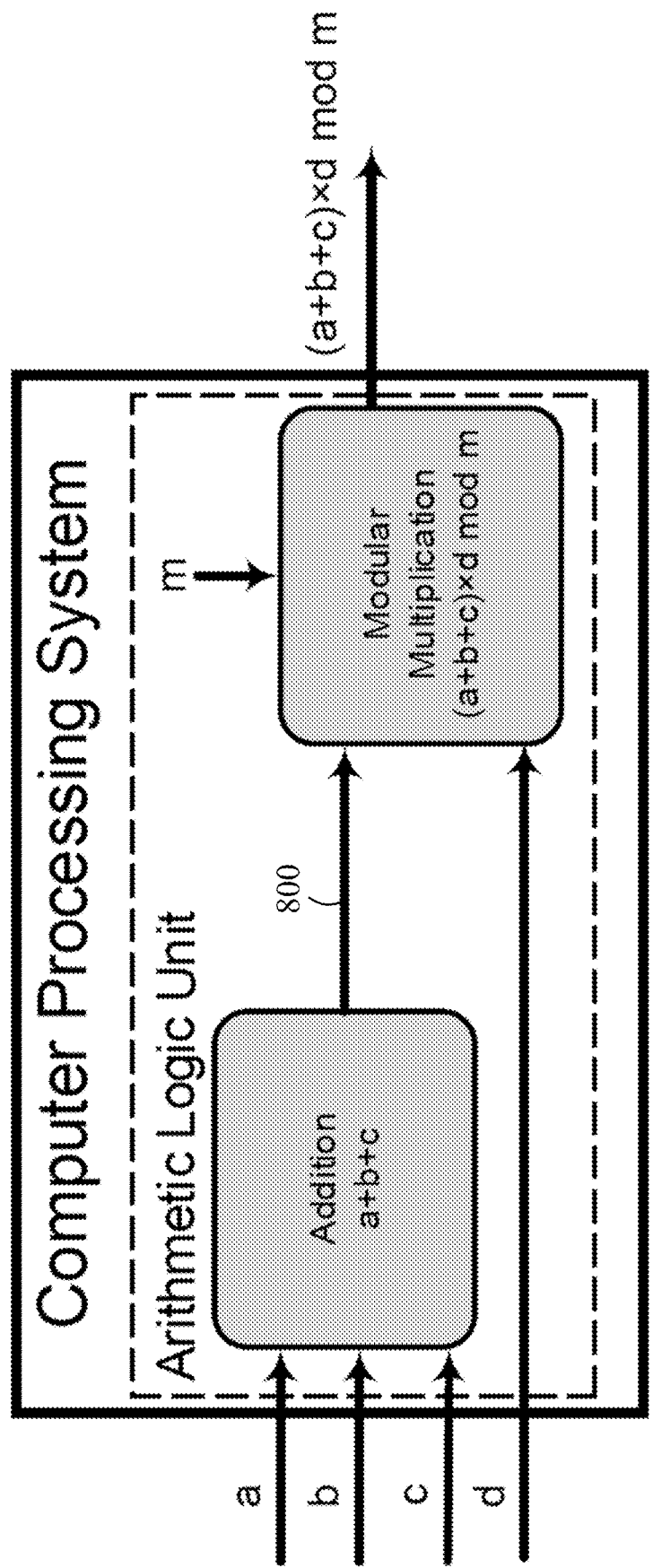
FIG. 8 is a schematic diagram depicting an embodiment of this invention where a three-input addition circuit is cascaded to a modular multiplication circuit, to efficiently compute (a+b+c)×d mod m.
Figure 9:
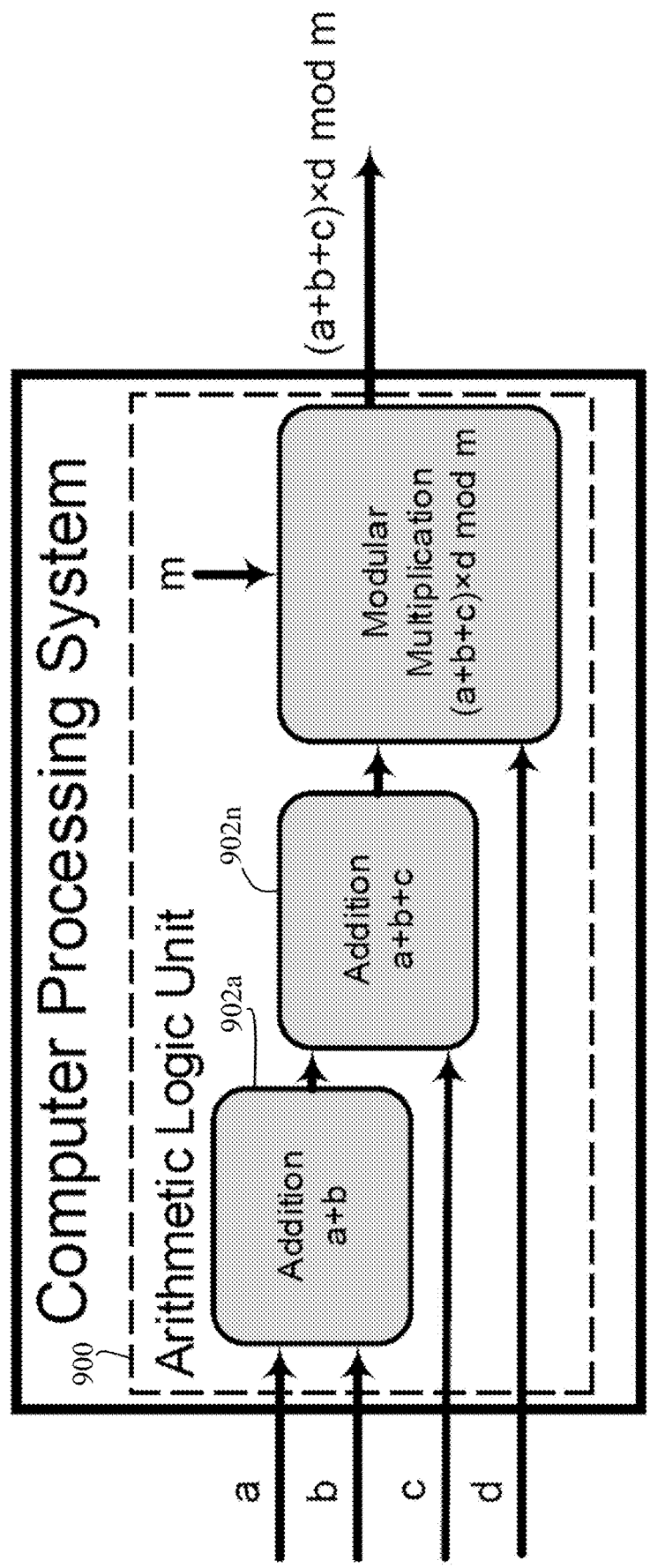
FIG. 9 is a schematic diagram depicting another embodiment of this innovation where two addition circuits in sequence are fed to a modular multiplication circuit, to efficiently compute (a+b+c)×d mod m.

As FIG. 8 shows, an additional interpretation of this innovation utilizes multiple modular additions performing without the conditional reduction if a modular multiplication is to follow. For instance, a 3-input modular addition that computes a+b+c mod m can be implemented as a sequence of two 2-input modular additions or a single 3-input modular addition. Similar to the primary embodiment of this invention, the use of a modular addition circuit is foregone and an addition circuit is used. In FIG. 8, the result of this 3-input addition circuit is fed into the modular multiplication unit. Said another way, the one or more addition circuit(s) is/are operably configured to take three or more numerical inputs to compute the sum 800. In one embodiment, the arithmetic logic unit 900 may include the at least one addition circuit 902a-n is operably configured to compute a difference between the three or more numerical inputs by performing an addition with at least one negated input, wherein the at least one negated input is computed from at least one of the three or more numerical inputs Multiple values can be added as a result of multiple addition stages or a single n-input addition unit. FIG. 9 shows an additional embodiment where a sequence of addition circuits are used such that the output of one addition circuit cascades into the next, which terminates with the modular multiplication circuit. It is simple to expand these circuits to cover larger input addition circuits and/or longer sequences of addition circuits. Additionally, one can feed the addition circuit's result to its own input to compute a sequence of addition computations, where, at some point, the result of the addition circuit will be fed to a modular multiplication circuit.

Modular subtraction is similar to modular addition and can be handled the same way. A modular subtraction is a subtraction followed by a conditional addition if the subtraction result is negative. Here, this conditional addition can be omitted and the result of the subtraction can be directly fed to the modular multiplication unit. If the modular multiplication unit cannot handle negative values, then one simple solution is to simply add a multiple of the modulus just before the modular multiplication to ensure the value is positive. When consecutive modular subtraction operations would have been performed, this saves the time and area of each conditional addition until the value is used as a multiplier or multiplicand.

Figure 10:
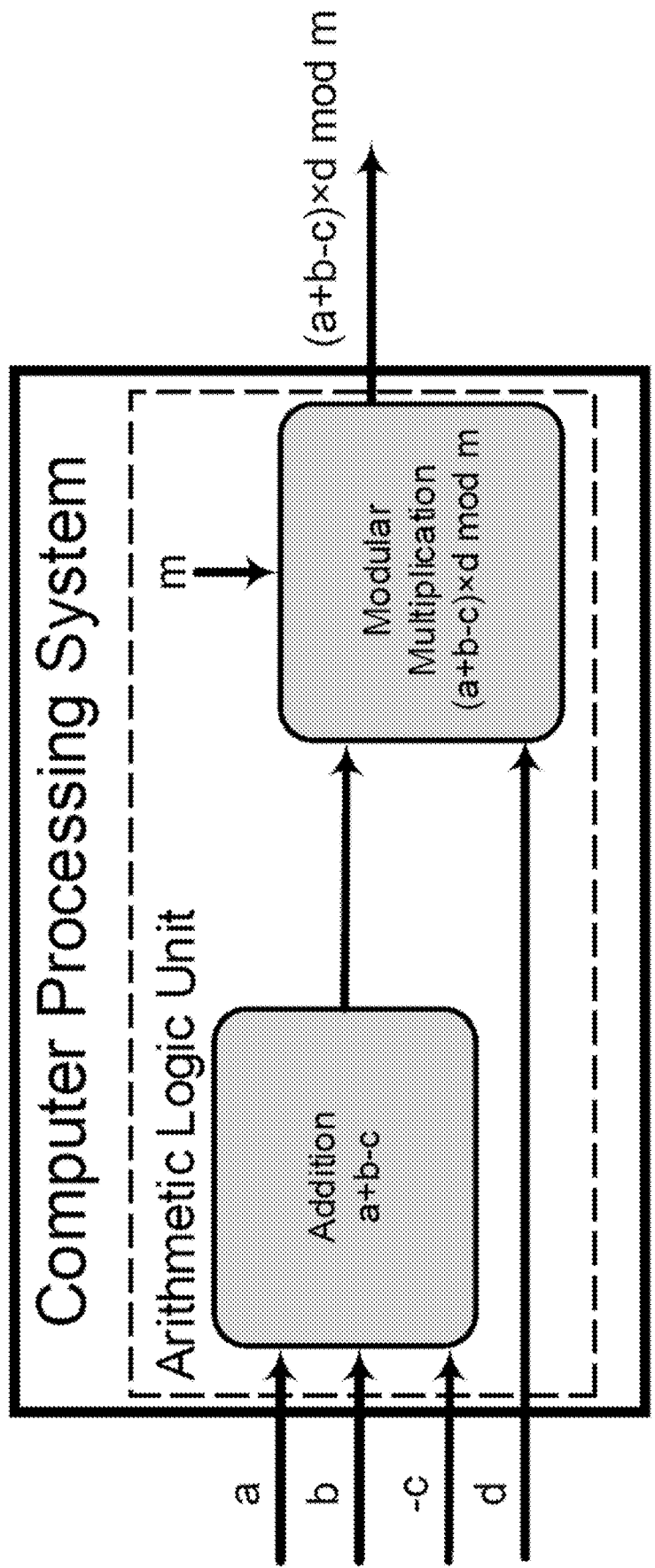
FIG. 10 is a schematic diagram depicting an embodiment of this innovation where one addition circuit input is negated so that the difference between inputs is computed, where the resulting sum is fed to the modular multiplication circuit, to efficiently compute (a+b−c)×d mod m.
Figure 11:
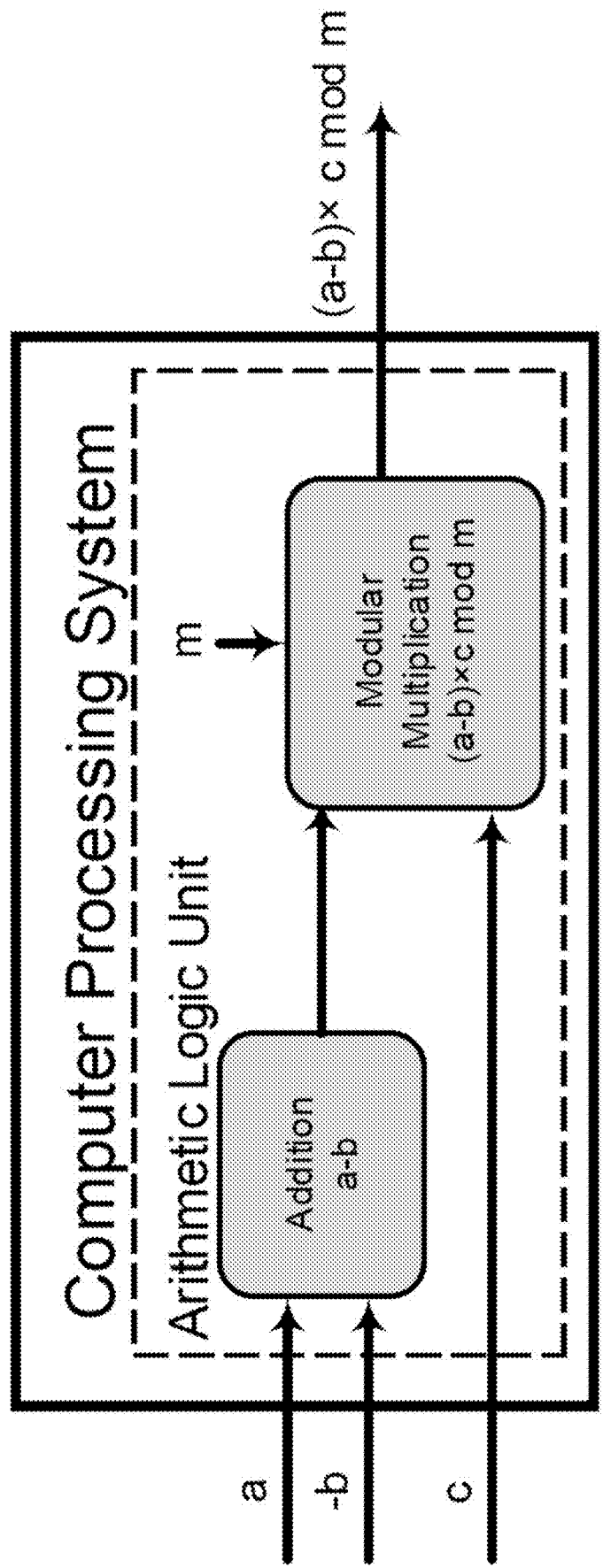
FIG. 11 is a schematic diagram depicting an embodiment of this innovation where one addition circuit input is negated so that the difference between inputs is computed, where the resulting sum is fed to the modular multiplication circuit, to efficiently compute (a−b)×c mod m.

FIG. 10 shows an embodiment of this invention where a 3-input addition circuit has one input negated, thus computing an addition and subtraction. With the prior art, this would have been performed via a modular addition circuit and a modular subtraction circuit, but our invention foregoes the conditional arithmetic in these circuits and only utilizes an addition and subtraction circuit. FIG. 11 shows this embodiment in a different light where a 2-input addition circuit has one input negated.

Figure 12:
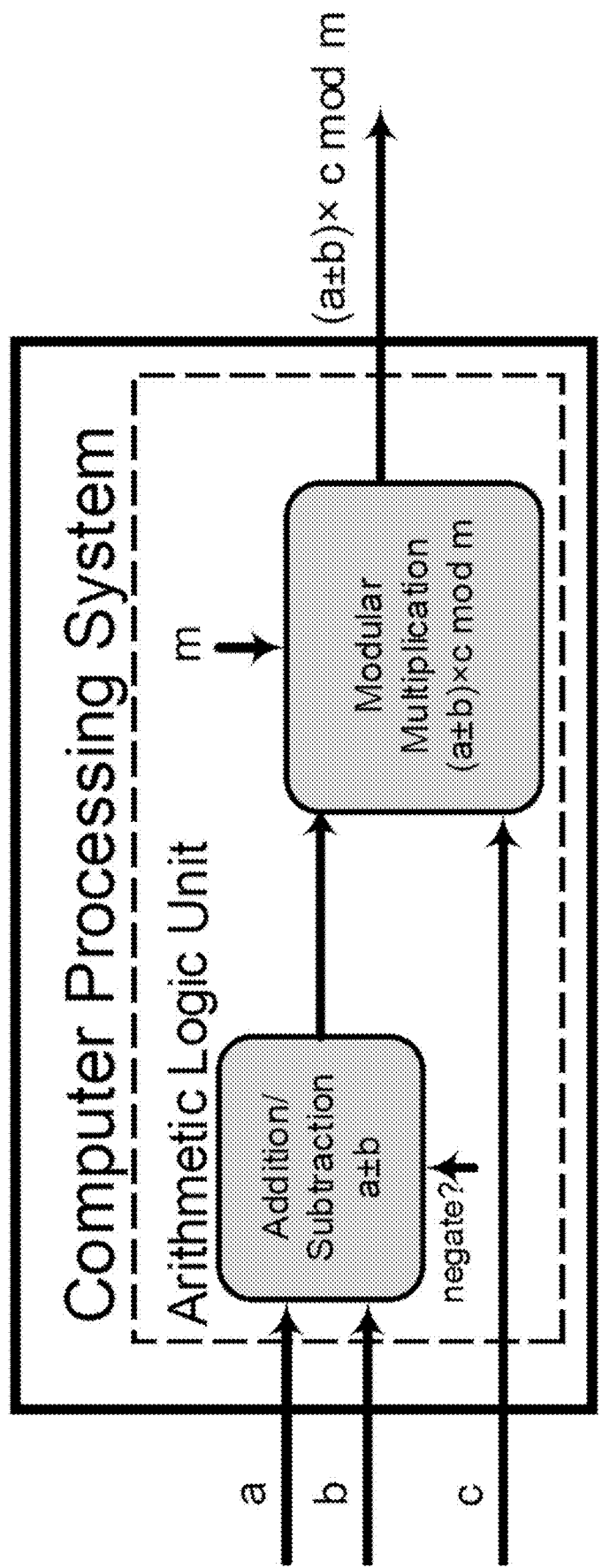
FIG. 12 is a schematic diagram depicting an embodiment of this innovation where one addition circuit input can be negated with a control signal so that the difference between inputs is computed, where the resulting sum is fed to the modular multiplication circuit, to efficiently compute (a+b)×c mod m.

FIG. 12 then shows an embodiment with a 2-input addition/subtraction circuit that utilizes an input to negate the second input, thus performing a+b if the negate line is low and a-b if the negate line is high. In one embodiment, the at least one addition circuit is operably configured to compute a difference between the two numerical inputs by performing an addition with at least one negated input, wherein the at least one negated input is computed from at least one of the two numerical inputs. Additionally, an inverter circuit may be beneficially utilized and operably configured to negate the one of the two numerical inputs to the one or more addition circuit(s).

In the above examples, one modular multiplication operand was received from the addition unit. It is simple to expand this such that both multiplication operations are received from an addition unit. Furthermore, a modular multiplication unit may not be strictly two inputs. This innovation applies to an n-port modular multiplier where at least one of the inputs are received from an addition unit.

This modular multiplication circuit can be constructed as a multiplication then reduction or simultaneous multiplication and reduction. For instance, the Montgomery multiplication method is an efficient method that combines multiplication with Montgomery reduction. Montgomery reduction converts expensive divisions by the modulus that is not an exponent of 2, to a cheap division by an exponent of 2. For instance, Montgomery multiplication computes $a \times b \times R-1 \mod m$, where R is some power of 2. The reduction step involves three steps where the first step is to compute a quotient $q = a \times b \times -m^{-1} \mod m$, the second step is to compute $a \times b + q \times m$, and the third step is to divide by R. Finally, a subtraction could be performed if the result is greater than m. This is one example of an efficient modular multiplication circuit, but it is simple to apply this invention to many other types, such as Barrett multiplication, residue number system multiplication, or Mersenne prime multiplication.

In terms of applications, this scheme works well for elliptic curve and isogeny-based cryptosystems, including, but not limited to, elliptic curve Diffie-Hellman (ECDH), elliptic curve digital signature algorithm (ECDSA), elliptic curve-based password authenticated key exchange by juggling (ECJPAKE), Edwards curve digital signature algorithm (EdDSA), supersingular isogeny Diffie-Hellman (SIDH), commutative supersingular isogeny Diffie-Hellman (CSIDH), supersingular isogeny key encapsulation (SIKE), and short quaternion and isogeny signature (SQISign).

As an example, we show how this scheme would apply to elliptic curve-based cryptosystems utilizing quadratic extension field arithmetic. This could be for any of the schemes above that operate on elliptic curve-based arithmetic over a quadratic extension field. In particular, we target SIDH/SIKE which can operate over the quadratic extension with reduction $x^2+1$, or $i=\sqrt{-1}$. This quadratic extension field is defined with two prime field elements $a_0$ and $a_1$, which are reduced modulo the prime p. Thus, an element in the quadratic extension field is represented as $a_0+a_1 i$, where $a_0$ is the least significant finite field element and $a_1$ is the most significant finite field element. When performing a quadratic extension field multiplication $A \times B = C$, with A, B, C as quadratic extension field elements, we are performing $A \times B = (a_0+a_1 i) \times (b_0+b_1 i) = a_0 b_0 + a_0 b_1 i + a_1 b_0 i + a_1 b_1 i^2 = a_0 b_0 + a_0 b_1 i + a_1 b_0 i - a_1 b_1$. When grouped together, we are computing $c_0 = a_0 b_0 - a_1 b_1$ and $c_1 = a_0 b_1 + a_1 b_0$. When implementing this in a computer processing system, modular multiplications are avoided as they are much more expensive than modular additions. Thus, many implementations may use the strategy $c_0 = (a_0+a_1) \times (b_0-b_1) + a_0 b_1 - a_1 b_0$ and $c_1 = a_0 b_1 + a_1 b_0$. As practitioners can appreciate, this Karatsuba-based multiplication method only requires 3 modular multiplications rather than the naïve approach that requires 4 modular multiplications. The only downside is that additional modular additions are required. When applying this invention to this quadratic extension field arithmetic for the computation of $(a_0+a_1) \times (b_0-b_1)$, we have 2 addition circuits that feed to a modular multiplication circuit. Namely, we use one addition circuit for $a_0+a_1$ and the other for $b_0-b_1$, which is an addition circuit with the second input negated. The results of these two circuits are fed as two inputs to the modular multiplication circuit to compute the final result $(a_0+a_1) \times (b_0-b_1)$ which is reduced modulo p. Thus, this invention shows that this computation can efficiently be performed without the conditional addition or conditional subtraction circuits and can be used to speed up operations such as quadratic extension field arithmetic.

Figure 13:
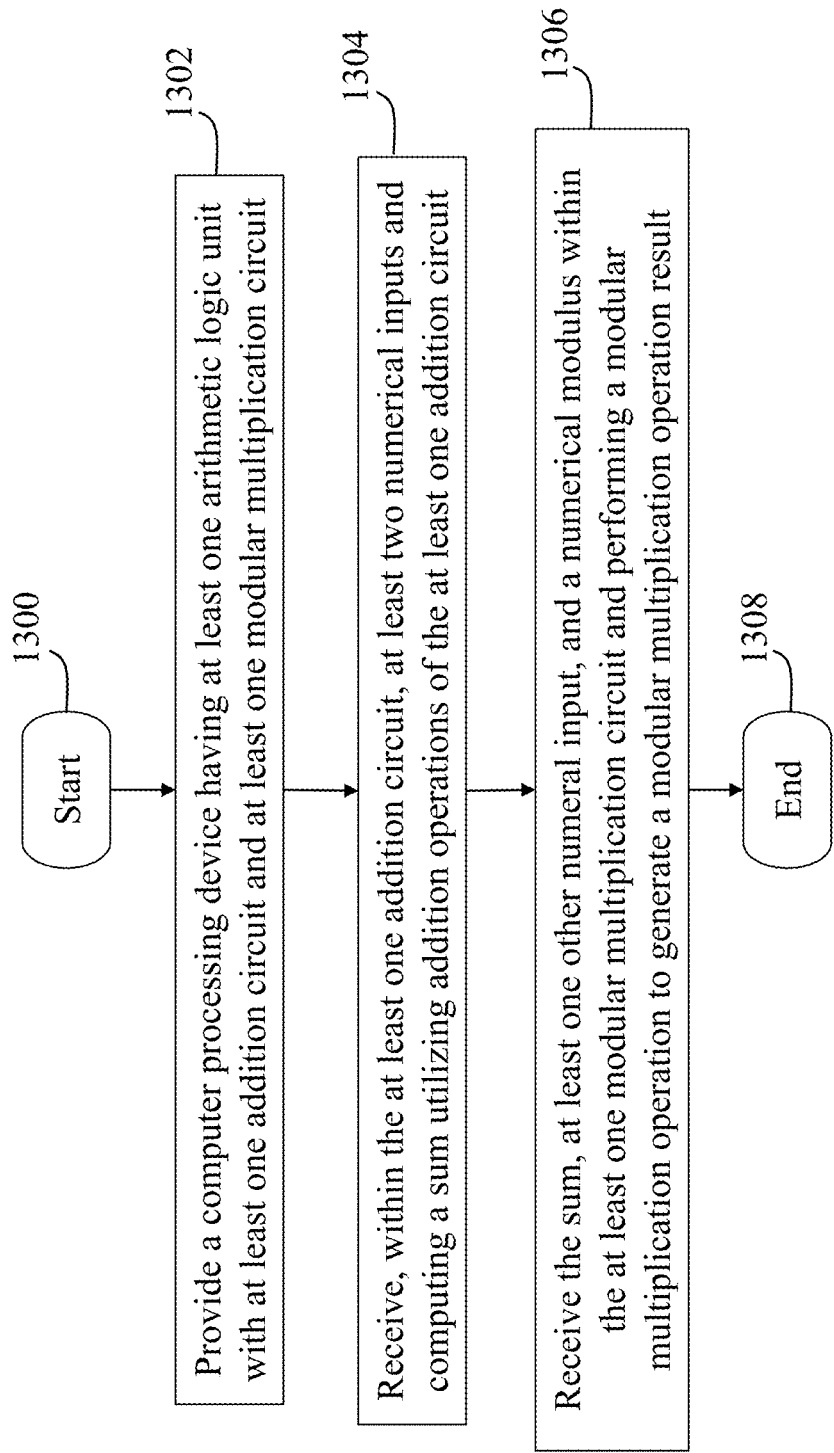
FIG. 13 is a process-flow diagram depicting a computer-implemented method for performing addition and modular multiplication sequences in accordance with one embodiment of the present invention.

With reference now to FIG. 13 in combination with FIG. 5, one exemplary computer-implemented method for performing addition and modular multiplication sequences is depicted. The process may begin at step 1300 and immediately proceed to step 1302 of providing a computer processing device having at least one arithmetic logic unit 502 with at least one addition circuit 504a-n and at least one modular multiplication circuit 506a-n. Thereafter, the process may continue to step 1304 of receiving, within the at least one addition circuit 204a-n, at least two numerical inputs and computing a sum utilizing addition operations of the at least one addition circuit 204a-n. Therefore, step 1306 may include receiving the sum, at least one other numerical input, and a numerical modulus within the at least one modular multiplication circuit 300a-n and performing a modular multiplication operation to generate a modular multiplication operation result. Thereafter, the process may terminate in step 1308. Other steps in the process may be utilized to carry out the present invention, however.

For example, the process may include providing at least one sequencing unit 600 within the at least one arithmetic logic unit of the computer processing device, directing the sum from the at least one addition circuit to the at least one modular multiplication circuit, and performing a sequence of at least one of the addition operations and terminating the sequence with the modular multiplication operation. In other embodiments, the process may include storing the sum in a memory by the at least one sequencing unit and directing the sum stored on the memory to the at least one modular multiplier circuit. Additionally, the process may include directly receiving the sum in the at least one modular multiplication circuit from the at least one addition circuit. To that end, FIGS. 5-12 could be described as occurring in conjunction with the process flow chart of FIG. 13. Although FIG. 13 shows a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIG. 13 for the sake of brevity. In some embodiments, some or all of the process steps included in FIG. 13 can be combined into a single process.

Various modifications and additions can be made to the exemplary embodiments discussed above without departing from the scope of the present disclosure. For example, while the embodiments described above refer to particular features, the scope of this disclosure also includes embodiments having different combinations of features and embodiments that do not include all of the above described features.

What is claimed is:

1. A computer processing system comprising:
   at least one arithmetic logic unit in a computer processing device operably configured to perform quadratic extension field multiplication for use in an isogeny-based cryptosystem and having:
   at least one addition circuit operably configured to compute addition operations, operably configured to receive two numerical inputs, and operably configured to compute a sum; and
   at least one modular multiplication circuit operably configured to receive the sum from the at least one addition circuit, receive at least one other numerical input, and receive a numerical modulus to perform a modular multiplication operation as part of the quadratic extension field multiplication and generate a modular multiplication operation result without a conditional subtraction circuit in the at least one arithmetic logic unit.

2. The computer processing system according to claim 1, further comprising:
   at least one sequencing unit operably configured to direct the sum from the at least one addition circuit to the at least one modular multiplication circuit to perform a sequence of at least one of the addition operations and terminating the sequence with the modular multiplication operation.

3. The computer processing system according to claim 2, wherein:
   the at least one sequencing unit is operably configured to store the sum in a memory and operably configured to direct the sum stored on the memory to the at least one modular multiplier circuit.

4. The computer processing system according to claim 1, wherein:
   the at least one modular multiplication circuit operably configured to directly receive the sum from the at least one addition circuit.

5. The computer processing system according to claim 1, wherein:
   the at least one addition circuit is operably configured to take three or more numerical inputs to compute the sum.

6. The computer processing system according to claim 5, wherein the arithmetic logic unit further comprises:
   the at least one addition circuit is operably configured to compute a difference between the three or more numerical inputs by performing an addition with at least one negated input, wherein the at least one negated input is computed from at least one of the three or more numerical inputs.

7. The computer processing system according to claim 1, wherein:
   the at least one addition circuit is operably configured to compute a difference between the two numerical inputs by performing an addition with at least one negated input, wherein the at least one negated input is computed from at least one of the two numerical inputs.

8. The computer processing system according to claim 7, wherein the at least one addition circuit further comprises:
   an inverter circuit operably configured to negate the one of the two numerical inputs to the at least one addition circuit.

9. The computer processing system according to claim 1, wherein:
   the at least one modular multiplication circuit is operably configured to perform any combination of Montgomery multiplication, Barrett multiplication, residue number system multiplication, or Mersenne-prime multiplication to generate the modular multiplication result of the modular multiplication operation.

10. The computer processing system according to claim 1, wherein:
    the arithmetic logic unit is operably configured to perform the quadratic extension field multiplication utilizing the sum and the modular multiplication operation result.

11. The computer processing system according to claim 1, wherein:
    the at least one addition circuit and at least one modular multiplication circuit are used additionally as part of an elliptic curve cryptosystem.

12. A computer-implemented method for performing addition and modular multiplication sequences comprising the steps of:
    providing a computer processing device having at least one arithmetic logic unit with at least one addition circuit and at least one modular multiplication circuit;
    performing, with the at least one arithmetic logic unit, quadratic extension field multiplication for use in an isogeny-based cryptosystem;
    receiving, within the at least one addition circuit, at least two numerical inputs and computing a sum utilizing addition operations of the at least one addition circuit; and
    receiving the sum, at least one other numerical input, and a numerical modulus within the at least one modular multiplication circuit and performing a modular multiplication operation as part of the quadratic extension field multiplication to generate a modular multiplication operation result without a conditional subtraction circuit in the at least one arithmetic logic unit.

13. The method according to claim 12, further comprising:
    providing at least one sequencing unit within the at least one arithmetic logic unit of the computer processing device;
    directing the sum from the at least one addition circuit to the at least one modular multiplication circuit; and
    performing a sequence of at least one of the addition operations and terminating the sequence with the modular multiplication operation.

14. The method according to claim 13, further comprising:
    storing the sum in a memory by the at least one sequencing unit; and
    directing the sum stored on the memory to the at least one modular multiplier circuit.

15. The method according to claim 12, further comprising:
    directly receiving the sum in the at least one modular multiplication circuit from the at least one addition circuit.

16. The method according to claim 12, further comprising:

computing, with the at least one addition circuit, a difference between the at least two numerical inputs by performing an addition with at least one negated input; and computing the at least one negated input from at least one of the at least two numerical inputs.

17. The method according to claim 16, further comprising:

providing an inverter circuit within the at least one addition circuit; and negating the one of the at least two numerical inputs to the at least one addition circuit.

18. The method according to claim 12, further comprising:

performing any combination of Montgomery multiplication, Barrett multiplication, residue number system multiplication, or Mersenne-prime multiplication with the at least one modular multiplication circuit to generate the modular multiplication result of the modular multiplication operation.

19. The method according to claim 12, further comprising:

performing the quadratic extension field multiplication by the arithmetic logic unit utilizing the sum and the modular multiplication operation result.

20. The method according to claim 12, further comprising:

utilizing the at least one addition circuit and at least one modular multiplication circuit additionally as part of an isogeny-based cryptosystem.

* * * * *